United States Patent [19]
Rafter et al.

[11] Patent Number: 5,858,246
[45] Date of Patent: Jan. 12, 1999

[54] METHOD OF WATER PURIFICATION WITH OXIDES OF CHLORINE

[75] Inventors: John D. Rafter, Providence; Joseph W. Grenier, North Providence; Raymond P. Denkewicz, Jr., Warwick, all of R.I.

[73] Assignee: Fountainhead Technologies, Inc., Smithfield, R.I.

[21] Appl. No.: 783,558

[22] Filed: Jan. 14, 1997

[51] Int. Cl.$^6$ .................................. C02F 1/50; C02F 1/76
[52] U.S. Cl. .................. 210/754; 210/753; 210/759; 210/764; 422/28; 422/37
[58] Field of Search .................... 210/749, 753, 210/754, 759, 764; 422/28, 37

[56] References Cited

U.S. PATENT DOCUMENTS

| | | | |
|---|---|---|---|
| 3,702,298 | 11/1972 | Zsoldos et al. | 210/754 |
| 3,770,646 | 11/1973 | Partridge . | |
| 3,791,979 | 2/1974 | Partridge . | |
| 4,049,784 | 9/1977 | Fuller . | |
| 4,079,123 | 3/1978 | Fuller et al. . | |
| 4,086,328 | 4/1978 | Swindells . | |
| 4,137,296 | 1/1979 | Glew et al. . | |
| 4,403,374 | 9/1983 | Wood . | |
| 4,681,739 | 7/1987 | Rosenblatt et al. . | |
| 5,104,660 | 4/1992 | Chvapil . | |
| 5,108,649 | 4/1992 | Matsumoto et al. . | |
| 5,124,164 | 6/1992 | Matsumoto et al. . | |
| 5,217,626 | 6/1993 | Yahya et al. | 210/764 |
| 5,330,658 | 7/1994 | Grant et al. . | |
| 5,342,528 | 8/1994 | Adachi et al. . | |
| 5,352,369 | 10/1994 | Hernig, Jr. | 210/760 |
| 5,435,984 | 7/1995 | Daly et al. . | |
| 5,476,579 | 12/1995 | Choi et al. . | |
| 5,603,844 | 2/1997 | Murphy et al. . | |

FOREIGN PATENT DOCUMENTS

| | | | |
|---|---|---|---|
| 1146707 | 5/1983 | Canada | 210/754 |
| 19514 612 A1 | 10/1996 | Germany . | |
| 49-89344 | 8/1974 | Japan | 210/754 |
| 54-58948 | 5/1979 | Japan | 210/754 |
| 85532 | 4/1986 | Luxembourg . | |
| 355086 | 8/1931 | United Kingdom | 210/754 |
| WO 94/02423 | 2/1994 | WIPO . | |
| WO 95/26318 | 10/1995 | WIPO . | |
| WO 96/07617 | 3/1996 | WIPO . | |
| WO 96/33947 | 10/1996 | WIPO . | |

OTHER PUBLICATIONS

Mario, "The disinfection in surface water drinking treatment in the near future," *Water Supply,* 8(3/4):225–233 (1990).

International Search Report mailed on May 25, 1998 in corresponding International Application No. PCT/US97/22717.

Yapijakis, C., "Rx for H20" *Water & Water Engineering,* pp. 33–37 (May, 1978).

White, G.C., "Chlorine Dioxide," *Handbook of Chlorination and Alternative Disinfectancts,* Van Nostrand Reinhold, New York, Chapter 12, pp. 980–1045 (1992).

White, G. C., "Chlorine Dioxide," *The Handbook of Chlorination,* Second Edition, Van Nostrand Reinhold Company, New York, pp. 833–892 (1986).

Derwent Abstract (Accession No. 91–155167/21) of SU1594135–A Sep. 23, 1990.

Derwent Abstract (Accession No. 87–287026/41) of JP62198860–A Sep. 2, 1987.

Derwent Abstract (Accession No. 83–767679/38) of JP58135458–A Aug. 12, 1983.

Derwent Abstract (Accession No. 80–86425C/49) of CA1089627–A Nov. 18, 1980.

Derwent Abstract (Accession No. 79–02102B/02) of DE2728170–A Jan. 4, 1979.

Derwent Abstract (Accession No. 95–304617) of JP07304617 Nov. 21, 1995.

*Primary Examiner*—Neil McCarthy
*Attorney, Agent, or Firm*—Dean W. Russell; Bruce D. Gray; Kilpatrick Stockton LLP

[57] ABSTRACT

A method of purifying water includes contacting water containing an oxide of chlorine, such as chlorine dioxide, chlorite, or chlorate, with a water purification composition that includes a Group 11 or Group 12 metal such as silver, copper, or zinc.

28 Claims, No Drawings

METHOD OF WATER PURIFICATION WITH OXIDES OF CHLORINE

BACKGROUND OF THE INVENTION

The invention relates to water purification.

Water must be effectively treated to remove or stop the growth of micro-organisms such as bacteria, parasites, or algae, particularly when the water is confined. Confined volumes of water are highly susceptible to rapid microorganism growth and can become health hazards if not properly and regularly treated. Water purification can be accomplished by filtration or by treating the water with chlorine, bromine, ozone, or silver ions to provide water suitable for consumption or for use in recirculating systems such as swimming pools, hot tubs, spas, or cooling towers. For example, water can be treated with silver-containing materials described, for example, in U.S. Pat. No. 5,352,369 and in U.S. Ser. No. 08/628,405, filed Apr. 5, 1996 now U.S. Pat. No. 5,772,896 entitled "Self-Regulating Water Purification Composition" and filed Apr. 5, 1996, which are incorporated herein by reference.

In recent years, chlorine dioxide ($ClO_2$ (g)) has been used to disinfect drinking water. See, for example, C. Yapijakis "$R_x$ for $H_2O$" Water & Water Engineering, May (1978), p. 33–37 and "Chlorine Dioxide" in *Handbook of Chlorination and Alternative Disinfectants,* G. C. White, Van Nostrand Reinhold, New York (1992), Chapter 12, p. 980–1045. Chlorine dioxide can be generated in several different ways. For example, chlorine dioxide can be produced by introducing chlorine gas into the flowing stream containing chlorite ($ClO_2^-$) or chlorate ($ClO_3^-$). Chlorine dioxide also can be produced by lowering the pH of a concentrated solution of chlorite or chlorate. This can be done either directly in water or, as in certain methods of disinfecting bandaged wounds, by adding an acid (e.g., citric acid) and water to a dry powder containing salts of chlorite or chlorate, as described, for example, in Chvapil et al. U.S. Pat. No. 5,104,660. Chlorine dioxide also can be generated by adding chlorine (HOCl) or exposing a catalyst to a solution containing chlorite. See, for example, Daly et al. U.S. Pat. No. 5,435,984.

SUMMARY OF THE INVENTION

In one aspect, the invention features a method of purifying water including the step of contacting water containing an oxide of chlorine, such as chlorine dioxide, chlorite, or chlorate, with a water purification composition including a Group 11 or Group 12 metal, such as silver, copper, or zinc. Preferably, the water contains chlorite.

In preferred embodiments, the water has a pH between about 5 and 9. More preferably, the water has a pH between 6 and 8. Most preferably, the water has a pH between 6.5 and 7.5.

Preferably, the water purification composition includes a silver-containing material, and the silver-containing material maintains a silver ion concentration in the water of between 0.01 and 0.1 ppm. The silver-containing material can include a second metal like zinc, copper, aluminum, iron, or manganese. The silver-containing material may further include an inorganic oxide having a zeta potential less than or equal to +20 mV in the water being purified (e.g., alumina).

The water may further contain a peroxygen compound or a halogen. Preferably, the peroxygen compound is a peroxymonosulfate such as potassium peroxymonosulfate.

The water may be recirculated, for example, in swimming pools, spas, cooling towers, or other industrial applications. Alternatively, the water can be single pass water, such as drinking water or waste water.

In another aspect, the invention features a method of purifying water including the steps of adding an oxide of chlorine (i.e., chlorine dioxide, chlorite, or chlorate) to water; and contacting the water with a water purification composition including a Group 11 or Group 12 metal (i.e., silver, copper, or zinc).

In yet another aspect, the invention features a method of purifying water including: (1) adding an oxide of chlorine to water; (2) adding a peroxygen compound or a halogen to the water; and (3) contacting the water with a water purification composition including a Group 11 or Group 12 metal.

The water purification composition can be a silver-containing material. Alternatively, the water purification composition can include copper or zinc. The silver-containing material can maintain a silver ion concentration in the water of between 0.01 and 0.1 ppm.

As used herein, "halogen" means free available chlorine or bromine in water. The halogen can be an active agent in the purification of the water.

As used herein, "purifying water" means killing bacteria, killing algae, killing cysts, destroying viruses, or stopping the growth of algae in water. Purifying water also can include destroying other parasites in the water.

The method is an effective way to treat and disinfect water. The method is economical and generally does not present significant carcinogenic and environmental threats. For example, the method can effectively destroy and kill bacteria, viruses, fungi, spores, cysts, or parasites in water, including Giardia, Cryptosporidium, or Legionella. The method of treating water also effectively controls levels of algae in the water.

Other advantages and features of the invention will be apparent from the detailed description, and from the claims.

DETAILED DESCRIPTION

Water can be purified by dissolving salts including chlorite ($ClO_2^-$) or chlorate ($ClO_3^-$) in water at a concentration of up to 200 mg/L and adding Group 11 or 12 ions (e.g., silver ($Ag^+$), copper, or zinc ions) to the water (e.g., at concentrations of up to 0.1 ppm, 2 ppm, or 5 ppm, respectively). Alternatively, chlorine dioxide gas ($ClO_2$ (g)) can be dissolved in the water with the silver ions, copper ions, or zinc ions. For example, the chlorine dioxide can be prepared independently and added to the water, or the chlorine dioxide can be generated from chlorite or chlorate in the water by adding an acid or other catalyst to the solution. Copper or zinc ions can be added to the water instead of or in addition to the silver ions.

The chlorite or chlorate can be the anion of any salt that is soluble in water at concentrations up to 200 mg/L. Preferably, the concentration of chlorite or chlorate is less than 50 mg/L. More preferably, the concentration of chlorite or chlorate is less than 20 mg/L. The chlorite or chlorate concentration is preferably greater than 0.02 mg/L. Examples of suitable chlorite or chlorate salts include the lithium, sodium, potassium, calcium, magnesium, silver, copper, or zinc salts.

The silver ion concentration in the water can be produced by dissolving a silver salt in water or by exposing the water to a water purification composition that includes silver. Copper or zinc ions can be added to the water by exposing water to water purification materials that include copper, or zinc or by dissolving an appropriate salt in the water. The silver, copper, or zinc in the water purification material can be a metal or metal salt. For example, the water purification compositions described in U.S. Pat. No. 5,352,369 and in U.S. Ser. No. 08/628,405 are appropriate silver-containing materials for introducing silver ions into the water. The silver-containing material can include silver metal on a support. The support can be a ceramic and can include an inorganic oxide, e.g., an aluminum oxide. The silver can be chemically deposited on the ceramic support or dispersed as a powder, shavings, or turnings with the ceramic support. The silver-containing material can include a second metal, preferably zinc, copper, aluminum, iron, or manganese, most preferably, zinc. Alternatively to the silver-containing material, the water purification composition can be a composition that introduces copper or zinc ions into the water. The water purification composition can be in powder, granule, tablet, stick, monolithic ceramic foam, or any other suitable form.

The water can contain other oxidizing agents to enhance the purifying ability of the chlorite or chlorate and silver ions. The additional oxidizing agents include halogens, such as chlorine (e.g., trichloroisocyanurate or calcium hypochlorite) or bromine, and peroxygen compounds, such as potassium peroxymonosulfate or hydrogen peroxide. The preferred oxidizing agent is potassium peroxymonosulfate. Potassium peroxymonosulfate is a triple salt mixture of $K_2SO_4 \cdot KHSO_4 \cdot 2KHSO_5$ (OXONE™, manufactured by E.I. duPont de Nemours and Company, Inc, Delaware). The oxidizing agent helps provide low levels of chlorine dioxide to the water. Peroxymonopersulfate can also convert a halide (i.e., chloride or bromide) into a halogen (i.e., chlorine or bromine).

The water purified by the method has a pH that is nearly neutral (i.e., it is not particularly acidic or basic). Preferably, the pH of the water being purified is between 5 and 9. More preferably, the pH of the water is between 6 and 8 and, most preferably, the pH is between 6.5 and 7.5.

The water purified according to the method can be single pass water, such as drinking water or waste water, or recirculated water, such as water in swimming pools, spas, cooling towers, or other industrial applications where a recirculating body of water is disinfected.

It is believed there is a synergy between silver ion and chlorine dioxide, chlorite, or chlorate. By adding silver ion to the water being treated prior to formation of chlorine dioxide, greater disinfecting ability can be imparted on both the chlorine dioxide generated in the water and the residual chlorite or chlorate dissolved in the water. Typically the silver ion concentration is not greater than 0.1 ppm.

Silver ions in combination with chlorite (or chlorate) in water are effective at killing bacteria, as shown in Examples 1–14. In addition, bactericidal activity of chlorite is enhanced when an oxidizing agent (i.e., peroxymonosulfate) is added to the water, as demonstrated in Examples 8–14. In particular, the combination of chlorite with silver ion and an oxidizing agent such as potassium peroxymonosulfate kills bacteria efficiently in water. The method of treating water by adding chlorite and silver ions to water is also suitable to control the growth of algae, as demonstrated in Examples 15–21.

The following Examples are to be construed as merely illustrative, and not limitive, of the remainder of the disclosure.

EXAMPLES 1–7

Aqueous solutions of chlorite ($ClO_2^-$), chlorate ($ClO_3^-$) and silver ions ($Ag^+$) were tested alone and in various combinations for their bactericidal efficacy against an inoculum of E. coli. Experiments were conducted in 500 mL of room temperature, double distilled, deionized water at pH 7.0 in acid-washed, pre-sterilized 1 L Erlenmeyer flasks. The flasks were inoculated with approximately $2 \times 10^6$ colony forming units per mL (CFU/mL) of E. coli. 1 mL aliquots were taken after 20 minutes of contact time and neutralized with 0.01 mL of a solution containing 10% sodium thioglycolate and 14.6% sodium thiosulfate. The efficacy of this neutralizer was determined to be 100% effective against the various agents tested. The results of the tests are summarized in Table 1. As demonstrated in Examples 5–7, silver ions in combination with chlorite or chlorate showed a bactericidal synergy against E. coli. The bactericidal activity of the solutions containing, e.g., silver ions and chlorite was greater than the sum of the activities of each component alone.

TABLE 1*

| Example | System | Log Reduction |
|---|---|---|
| 1 | $ClO_2^-$ | 0 |
| 2 | $ClO_3^-$ | 0 |
| 3 | $ClO_2^-$ & $ClO_3^-$ | 0 |
| 4 | $Ag^+$ | 1.19 |
| 5 | $Ag^+$ & $ClO_2^-$ | >4.0 |
| 6 | $Ag^+$ & $ClO_3^-$ | 2.11 |
| 7 | $Ag^+$, $ClO_2^-$ & $ClO_3^-$ | >5.14 |

*Concentrations were as follows:
$Ag^+$ = 0.05 ppm;
$ClO_2^-$ = 5.0 ppm;
$ClO_3^-$ = 0.2 ppm.

EXAMPLES 8–14

Additional experiments were performed with aqueous solutions of chlorite, silver ions, and potassium peroxymonosulfate (hereinafter MPS) in various combinations to determine the bactericidal activity of the components (i.e., low levels of chlorine dioxide in combination with silver ions) against E. coli. Experiments were conducted in 500 mL room temperature, double distilled, deionized water at pH 7.0 in acid-washed, pre-sterilized 1 L Erlenmeyer flasks. The flasks were inoculated with approximately $2 \times 10^6$ CFU/mL of E. coli. 1 mL samples were taken after 10 minutes of contact time and neutralized with 0.01 mL of a solution containing 10% sodium thioglycolate and 14.6% sodium thiosulfate. The efficacy of this neutralizer was determined to be 100% effective against the various agents tested. Results of the experiments are summarized in Table 2. As the results of Examples 12–14 demonstrate, chlorite in combination with MPS or silver ion show a synergy in their bactericidal activity against E. coli.

TABLE 2*

| Example | System | Log Reduction |
|---|---|---|
| 8 | MPS | 0.46 |
| 9 | $Ag^+$ | 0.26 |
| 10 | $ClO_2^-$ | 0 |
| 11 | MPS & $Ag^+$ | 0.38 |
| 12 | $Ag^+$ & $ClO_2^-$ | 2.0 |

TABLE 2*-continued

| Example | System | Log Reduction |
|---|---|---|
| 13 | MPS & $ClO_2^-$ | 2.47 |
| 14 | MPS, $Ag^+$, & $ClO_2^-$ | >5.2 |

*Concentrations were as follows:
MPS (as $Cl_2$) = 4.5 ppm;
$Ag^+$ = 0.034 ppm;
$ClO_2^-$ = 4.8 ppm;
$ClO_3^-$ = 0.2 ppm.

EXAMPLES 15–17

The ability of silver ions, chlorite, and the combination of silver ions and chlorite to prevent the growth of the green alga *Chlorella vulgaris* was tested. The tests were carried out using 25 mL of sterile Allen's medium (329 mg $K_2HPO_4 \cdot 3H_2O$, 66 mg $CaCl_2 \cdot 2H_2O$, 50 mg $NH_4Cl$, 1000 mg $NaNO_3$, 513 mg $MgSO_4 \cdot 7H_2O$ and 1 mL of 3,000 ppm $FeCl_3$ solution in 1 L distilled, deionized water) at room temperature in 50 mL acid washed, sterilized Erlenmeyer flasks. The pH of each solution was adjusted to 6.5–7.5 using 1N NaOH and 1N $HNO_3$. The flasks containing the various test solutions were inoculated with approximately $5 \times 10^5$ cells/mL of the test alga and placed on an orbital shaker at 500 rpm under 200 ft-candles of illumination. After 96 hours the cells in a 10 μL aliquot from each flask were counted using a hemacytometer counting chamber and inhibition of growth relative to a control was calculated. Results are summarized in Table 3. The results of Example 17 indicate that silver ions with chlorite are synergistic in their algistatic activity against *Chlorella vulgaris*.

TABLE 3*

| Example | System | Growth Inhibition (%) |
|---|---|---|
| 15 | $Ag^+$ | 26% |
| 16 | $ClO_2^-$ | 10% |
| 17 | $Ag^+$ & $ClO_2^-$ | 100% |

*Concentrations were as follows:
$Ag^+$ = 0.05 ppm;
$ClO_2^-$ = 5.0 ppm.

EXAMPLES 18–21

After 7 days under 200 ft-candles of illumination with shaking at 500 rpm, the $Ag^+$ & $ClO_2^-$ solution described in Example 17 above still showed 100% growth inhibition. This solution was filtered through a sterile, 0.45 μm, Teflon syringe filter into a sterile, acid washed, 50 mL borosilicate glass Erlenmeyer flask. The pH of the solution was checked and found to be between 6.5 and 7.5. The solution was re-inoculated with *Chlorella vulgaris* to a cell concentration of approximately $5 \times 10^5$ cells/mL. The solution remained under 200 ft-candles of illumination on an orbital shaker at 500 rpm for 25 additional days. As Examples 18–21 illustrate, the algistatic activity of the $Ag^+/ClO_2^-$ solution is maintained over a period of at least 25 days, as suggested by the nearly constant concentration of cells in the sample (Table 4).

TABLE 4

| Example | Day | Cells/mL |
|---|---|---|
| 18 | 7 | $5.1 \times 10^5$ |
| 19 | 10 | $4.7 \times 10^5$ |
| 20 | 14 | $5.5 \times 10^5$ |
| 21 | 25 | $7.3 \times 10^5$ |

EXAMPLES 22–28

An experiment was performed to test the ability of $Ag^+$, $ClO_2^-$ and MPS and combinations of these three to prevent the growth of the green alga *Chlorella vulgarism*. These tests were carried out using 25 mL of sterile $Cl^-$ free Allen's medium (329 mg $K_2HPO_4 \cdot 7H_2O$, 1060 mg $Ca(NO_3)_2 \cdot H_2O$, 77 mg $NH_4NO_3$, 1000 mg $NaNO_3$, 513 mg $MgSO_4 \cdot 7H_2O$ and 72 mL of a 100 ppm iron nitrate solution in 928 mL distilled, deionized water) at room temperature in 50 mL acid washed, sterilized Erlenmeyer flasks. The pH of each solution was adjusted to 6.5–7.5 using 1N NaOH and 1N $HNO_3$. Flasks containing the various test solutions were inoculated with *Chlorella vulgaris* to a cell density of approximately $3 \times 10^5$ cells/mL and placed on an orbital shaker at 200 rpm under 200 ft-candles of illumination. After 96 hours, the cells in the 10 μL aliquot from each flask were counted using a hemacytometer counting chamber and inhibition of growth relative to a control was calculated. In order to determine if the treatments were having an algistatic or algicidal effect, 1 mL of each solution was transferred aseptically to a 50 mL acid washed, sterilized Erlenmeyer flask containing 24 mL of sterile, $Cl^-$ free Allen's medium and placed under 200 ft-candles of illumination on an orbital shaker at 200 rpm. After 10 days, the new flasks were examined for growth. If the new flasks showed growth, the cells had revived and the original solution was considered algistatic. If the new flasks showed no growth, the cells were dead and the original solution was considered algicidal. Results are shown in Table 5. Examples 22–24 illustrate that $Ag^+$, $ClO_2^-$ and MPS are all algistatic. Examples 25–28 show that combinations of $Ag^+$, MPS and $ClO_2^-$ are algicidal.

TABLE 5*

| Example | System | Growth Inhibition | Growth In Fresh Media | Algistatic/ Algicidal |
|---|---|---|---|---|
| 22 | $ClO_2^-$ | 25% | Yes | Algistat (mild) |
| 23 | $Ag^+$ | 98% | Yes | Algistat |
| 24 | MPS | 93% | Yes | Algistat |
| 25 | $Ag^+$ & MPS | 100% | No | Algicide |
| 26 | $Ag^+$ & $ClO_2^-$ | 90% | No | Algicide |
| 27 | MPS & $ClO_2^-$ | 100% | No | Algicide |
| 28 | $Ag^+$, MPS & $ClO_2^-$ | 100% | No | Algicide |

*Concentrations were as follows:
$Ag^+$ = 0.1 ppm;
$ClO_2^-$ = 10 ppm;
MPS = 10 ppm.

Other embodiments are within the claims. For example, the water containing chlorite or chlorate can be exposed to a catalyst to generate chlorine dioxide in the water, enhancing the purifying power of the mixture.

What is claimed is:

1. A method of purifying water comprising contacting water containing an oxide of chlorine selected from the group consisting of chlorine dioxide, chlorite, and chlorate, with a water purification composition comprising a Group 1 1 or Group 12 metal.

2. The method of claim 1, wherein the Group 11 or Group 12 metal includes silver, copper, or zinc.

3. The method of claim 2, wherein the water has a pH between about 5 and 9.

4. The method of claim 3, wherein the water further contains a peroxygen compound or a halogen.

5. The method of claim 3, wherein the water purification composition comprises a silver-containing material.

6. The method of claim 5, wherein the silver-containing material maintains a silver ion concentration in the water of between 0.01 and 0.1 ppm.

7. The method of claim 5, wherein the water contains chlorite.

8. The method of claim 7, wherein the water further contains a peroxygen compound or a halogen.

9. The method of claim 8, wherein the peroxygen compound comprises a peroxymonosulfate.

10. The method of claim 8, wherein the halogen comprises chlorine.

11. The method of claim 5, wherein the silver-containing material includes a second metal comprising zinc, copper, aluminum, iron, or manganese.

12. The method of claim 11, wherein said second metal comprises zinc.

13. The method of claim 11, wherein the silver-containing material further comprises an inorganic oxide having a zeta potential less than or equal to +20 mV in said water being purified.

14. The method of claim 13, wherein the inorganic oxide comprises alumina.

15. The method of claim 3, wherein the water is recirculated.

16. The method of claim 3, wherein the water is single pass water.

17. A method of purifying water comprising:
adding an oxide of chlorine selected from the group consisting of chlorine dioxide, chlorite salts, and chlorate salts to the water; and
contacting the water with a water purification composition comprising a Group 11 or Group 12 metal.

18. The method of claim 17, wherein the Group 11 or Group 12 metal includes silver, copper, or zinc.

19. The method of claim 18, wherein the water has a pH between about 5 and 9.

20. The method of claim 19, wherein the water contains a peroxygen compound or a halogen.

21. The method of claim 19, wherein the water purification composition is a silver-containing material.

22. The method of claim 21, wherein the water contains a peroxygen compound or a halogen.

23. A method of purifying water comprising the steps of:
adding an oxide of chlorine selected from the group consisting of chlorine dioxide, chlorite salts, and chlorate salts to water;
adding a peroxygen compound or a halogen to the water; and
contacting the water with a water purification composition comprising a Group 11 or Group 12 metal.

24. The method of claim 23, wherein the Group 11 or Group 12 metal includes silver, copper, or zinc.

25. The method of claim 24, wherein the water has a pH between about 5 and 9.

26. The method of claim 25, wherein the water purification composition is a silver-containing material.

27. The method according to claim 1, wherein the concentration of the oxide of chlorine is between 0.02 mg/L and 200 mg/L.

28. The method according to claim 27, wherein the concentration of the oxide of chlorine is between 0.02 mg/L and 50 mg/L.

* * * * *